US 7,423,406 B2

(12) United States Patent
Geniusz

(10) Patent No.: US 7,423,406 B2
(45) Date of Patent: Sep. 9, 2008

(54) POWER CONTROL OF AN INDUCTION MACHINE

(75) Inventor: Andrzej Geniusz, Kempen (DE)

(73) Assignee: Woodward Seg GmbH & Co KG, Kempen (DE)

( * ) Notice: Subject to any disclaimer, the term of this patent is extended or adjusted under 35 U.S.C. 154(b) by 0 days.

(21) Appl. No.: 10/572,235

(22) PCT Filed: Jul. 29, 2005

(86) PCT No.: PCT/EP2005/008244

§ 371 (c)(1),
(2), (4) Date: Jun. 15, 2006

(87) PCT Pub. No.: WO2006/024350

PCT Pub. Date: Mar. 9, 2006

(65) Prior Publication Data

US 2007/0052394 A1    Mar. 8, 2007

(30) Foreign Application Priority Data

Aug. 27, 2004  (EP) .................................. 04020382

(51) Int. Cl.
*H02P 25/28* (2006.01)
(52) U.S. Cl. ........................ 318/800; 318/609; 318/610; 318/802
(58) Field of Classification Search .................. 318/609, 318/610, 800, 805, 807, 811, 798, 802; 363/37, 363/71, 72, 34; 702/151
See application file for complete search history.

(56) References Cited

U.S. PATENT DOCUMENTS 3,506,900 A    4/1970  Neuffer et al.

(Continued)

FOREIGN PATENT DOCUMENTS

DE           40 32 056 C1      5/1992

(Continued)

OTHER PUBLICATIONS

Krzeminski, Z; "Sensorless Multiscalar Control of Double Fed Machine for Wind Power Generators"; Apr. 2, 2002, Power Conversion Conference, 2002. PCC-Osaka 2002. Proceedings for the Osaka, Japan Apr. 2-5, 2002, Piscataway, NJ, USA, IEEE, US, pp. 334-339, XP010590475.

*Primary Examiner*—Paul Ip
(74) *Attorney, Agent, or Firm*—Rankin, Hill & Clark LLP

(57) ABSTRACT

Regulation of the active and reactive power of an induction machine in a coordinate system fixed on the winding, wherein a first regulator output variable is generated using a first regulator as a function of a setpoint variable deviation of the active power and a second regulator output variable is generated using a second regulator as a function of a setpoint variable deviation of the reactive power, feedback variables are added to each of the first and second regulator output variables, which are functions of at least one chronologically changing system variable of the induction machine, and a voltage or a current of the induction machine is determined as a manipulated variable without further regulation at least from the first and second regulator output variables added to the feedback variables. The feedback variables may linearize the regulation path and then allow restriction to only two simple regulators, e.g., two PI regulators. The regulation may be used in double-fed asynchronous machines.

40 Claims, 3 Drawing Sheets

U.S. PATENT DOCUMENTS

| | | | |
|---|---|---|---|
| 4,441,065 A * | 4/1984 | Bayer et al. | 318/808 |
| 4,904,920 A * | 2/1990 | Rufer | 318/800 |
| 5,235,503 A * | 8/1993 | Stemmler et al. | 363/37 |
| 5,278,485 A * | 1/1994 | Kim | 318/802 |
| 5,668,459 A * | 9/1997 | Kim | 318/798 |
| 5,796,236 A * | 8/1998 | Royak | 318/804 |
| 5,798,631 A | 8/1998 | Spee et al. | |
| 6,448,735 B1 | 9/2002 | Gokhale et al. | |
| 6,611,437 B2 * | 8/2003 | Kawazoe et al. | 363/37 |
| 6,731,522 B2 * | 5/2004 | Kawazoe et al. | 363/37 |
| 6,876,169 B2 * | 4/2005 | Gallegos-Lopez et al. | 318/701 |
| 7,024,332 B2 * | 4/2006 | Kunzel et al. | 702/151 |
| 2003/0080701 A1 | 5/2003 | Kikuchi et al. | |
| 2003/0214823 A1 * | 11/2003 | Kawazoe et al. | 363/37 |
| 2004/0080968 A1 * | 4/2004 | Tarkiainen et al. | 363/132 |
| 2004/0135538 A1 * | 7/2004 | Gallegos-Lopez et al. | 318/807 |
| 2005/0002210 A1 * | 1/2005 | Moon et al. | 363/37 |
| 2005/0029982 A1 * | 2/2005 | Stancu et al. | 318/801 |

FOREIGN PATENT DOCUMENTS

WO     WO 2004/107556     12/2004

* cited by examiner

POWER CONTROL OF AN INDUCTION MACHINE

FIELD OF THE INVENTION

The present invention relates to the regulation of the active and reactive power of an induction machine.

BACKGROUND OF THE INVENTION

Induction machines such as synchronous machines and asynchronous machines having cage or slip-ring rotors are used in manifold technical applications both in motor operation and also in generator operation. For example, asynchronous and synchronous generators are used in facilities for the decentralized generation of electrical power, such as wind power facilities, shaft generators, flywheel accumulators, and block heating power plants.

At nearly constant speed, synchronous generators and asynchronous generators having short-circuit rotors are capable in principle of outputting the electrical power generated at constant voltage and frequency directly to the three-phase current mains. The advantages of such facilities are simple and robust construction, low maintenance outlay, and high reliability.

Variable-speed facilities, such as asynchronous machines having slip-ring rotors, are capable of outputting an adapted electrical power in the event of variable speed of the generator. The stator of the machine is connected to the mains and the amplitude and frequency of its voltage is predefined by the mains. A variable voltage having variable amplitude and frequency is applied to the rotor by a pulse-width-modulation inverter, which is a component of an inverter. By changing this three-phase system voltage applied to the rotor at variable slip frequency, all possible operating states (e.g., under-synchronous or over-synchronous operation and also motor and generator operation) may be set in this case.

Field-oriented regulation, as is described in EP 0 043 973 A1, for example, is typically used for regulating induction machines. The goal of field-oriented regulation is to implement the decoupling of field-producing and torque-producing components of the current, i.e., for the torque and the magnetization current (such as the rotor flux) to be adjustable independently of one another. This behavior results in asynchronous machines having slip-ring rotors if the rotor current is oriented to the rotor flux space pointer. The regulation occurs in a rotating field coordinate system. For this purpose the rotor position angle and the position of the stator voltage pointer have to be known for the coordinate transformation. The active and reactive power of the induction machine can only be regulated indirectly in this method, and a current control loop by a cascade regulation, which is subordinate to the power control loop, is additionally necessary.

In contrast to field-oriented regulation, the document "Sensorless Multiscalar Control of Double Fed Machine for Wind Power Generators" by Z. Krzeminski, presented at the IEEE Conference Power Conversion in Osaka, Japan, 2002, discloses power regulation for a double-fed asynchronous machine which is based on the regulation of a multiscalar system model. The system model is based on the definition of state variables of the asynchronous machine and associated state equations (differential equations) of the state variables. By using non-linear feedback, the state equations are linearized and the overall system is converted into two linear partial systems, a mechanical partial system and an electrical partial system. The regulation of the mechanical partial system is performed via a PI regulator which regulates the setpoint variable deviations of the state variables, which result as the cross product (i.e., vector product) of stator flux and rotor current, while the regulation of the electromagnetic partial system occurs via a PI regulator which regulates the setpoint variable deviations of the state variables, which result as the scalar product of stator flux and rotor current. To regulate the active and reactive power, it is necessary to superimpose a control loop for regulating the reactive and feedback power in the form of a cascade regulation on each of the control loops for regulating the mechanical and electromagnetic partial systems. In this case, the output variable of the active power regulator represents the setpoint variable for the mechanical control loop and the output variable of the reactive power regulator represents the setpoint variable for the electromagnetic control loop.

In the power regulation according to Krzeminski, the regulation is no longer performed in a rotating field coordinate system, but rather may be performed in a coordinate system fixed on the winding, i.e., in a coordinate system fixed either on the stator or on the rotor. By using the cross and scalar products of stator flux and rotor current, regulation in coordinate systems fixed on the winding becomes possible, since the products contain the complete information about the mutual position of stator flux vector and rotor current vector. The nonlinear feedback allows linearization and therefore simplification of the mechanical and electromagnetic control loops.

However, the power regulation of Krzeminski has some disadvantages. The parameters of the regulation are strongly dependent on the operating point used (e.g., the speed), so that the regulators of the power control loop used in the subordinate mechanical and electromagnetic control loops must be redesigned in the event of different operating points. In addition, the slip range of the regulation is restricted. Finally, unsatisfactory dynamics and stability of the regulation result.

SUMMARY OF THE INVENTION

It is therefore the object of the present invention to allow simple and simultaneously stable regulation of the active power and reactive power of induction machines.

To achieve this object, a method for regulating the active power and reactive power of an induction machine in a coordinate system fixed on the winding is suggested, a first regulator output variable being generated using a first regulator as a function of a setpoint variable deviation of the active power and a second regulator output variable being generated using a second regulator as a function of a setpoint variable deviation of the reactive power, and the first and second regulator output variables are added to the respective feedback variables, which are functions of at least one time changeable system variable of the induction machine, wherein at least a voltage or a current of the induction machine is determined as a manipulated variable from the first and second regulator output variables, added to the feedback variables, without further regulation.

The induction machine may be an asynchronous machine having a squirrel-cage rotor or slip-ring rotor or a synchronous machine, each of which may operate as a motor or generator. In the case of the asynchronous machine, both under-synchronous and over-synchronous operation are possible.

To control the active power and the reactive power of the induction machine, a setpoint variable for the active power and a setpoint variable for the reactive power are predefined and a possible setpoint variable deviation is ascertained by comparison with the measured active and reactive power (actual powers). In the event of setpoint variable deviations, a voltage or a current of the induction machine is changed as the manipulated variable of the regulation until the setpoint variable deviations disappear or at least fall below a predefined threshold. If the induction machine is a double-fed asynchronous machine, the setpoint variable may be the voltage applied to the rotor, for example.

The regulation is performed in a coordinate system fixed on the winding (fixed on the stator or rotor), which may be achieved through suitable selection of the feedback variables, for example. In contrast to field-oriented regulation, no information about the pointer position of currents and voltages of the induction machine (e.g., of the stator voltage pointer) in relation to a specific coordinate system is required in the regulation of the present invention.

According to the present invention, only one regulator is used in each case for the regulation of the setpoint variable deviation of the active power and the setpoint variable deviation of the reactive power. This regulator may be a linear regulator, such as a proportional regulator (P regulator), a proportional-integral regulator (PI regulator) having linear integrator algorithm, or a proportional-integral-differential regulator (PID regulator), or even a nonlinear regulator, such as a PI regulator having nonlinear integrator algorithm; however, all other types of regulators may also be used. This simple construction is achieved in that the active and reactive power are selected directly as the state variables which the regulation is based on. Further subordinate control loops may thus be dispensed with. Furthermore, the first and second regulator output variables are added to the feedback variables, which are selected in such a way that the state variables are at least partially decoupled and stabilization and simplification of the overall system is achieved.

Then, using an advantageously predefined function, a voltage or a current of the induction machine is ascertained as the setpoint variable from the first and second regulator output variables added to the feedback variables and possibly also from further variables, without a further regulation of the regulator output variables added to the feedback variables being necessary. Thus, it is no longer necessary in particular to adapt the regulator output variables to setpoint values of any type through the use of further regulators.

The basis for the achievement of the object according to the present invention is the multiscalar regulation approach, in which, in contrast to the related art, however, the active power and the reactive power are defined directly as state variables. This results in subordinate control loops being dispensed with in the synthesis of the regulation. Through the introduction of the feedback variables, the original state equations of the induction machine are reformed in such a way that stabilization and simplification of the state equations result. In this case, the feedback variables are determined as functions of at least one time changeable system variable of the induction machine, the above-mentioned time changeable system variables being represented by voltages, currents, or fluxes in the stator and/or rotor of the induction machine or by the rotor speed, for example. The feedback variables and the parameters of the regulators are advantageously adapted to one another and to the system to be regulated.

According to a preferred embodiment of the present invention, the regulators (46-1, 46-2) are linear regulators.

The feedback variables to which the first and second regulator output variables of the two regulators are added to may be selected in such a way that the overall system, which is nonlinear per se, is linearized by the selection of the active and reactive power as state variables.

Through the introduction of feedback variables selected in this way, the original state equations of the induction machine are reformed in such a way that the state equations of the active and reactive power are linearized. The linearized state equations may then be represented as linear elements in the state matrix, which describes the linkage of the state variables. In an especially advantageous case, the linearized state equations for the active and reactive power each correspond to a first-order low-pass system, for example. The time constants of these low-pass systems are dependent of the state matrix of the reformed overall system. Linear regulators may then be used to regulate the active and reactive power of the reformed system, through which a cost-effective regulation of the active and reactive power, which is also simple and stable in wide limits, may be implemented.

According to a further preferred embodiment of the present invention, the regulators are PI regulators. The PI regulator forces the rapid disappearance of a stationary regulation deviation. In this case, both ideal and nonideal PI regulators may be used. The time constants of the PI regulators are advantageously selected taking the influence of the feedback variables on the overall system into consideration.

According to a further preferred embodiment of the present invention, a rotor voltage of the induction machine is ascertained as the manipulated variable. The induction machine may then be a double-fed asynchronous machine, for example.

According to a further preferred embodiment of the present invention, a stator voltage of the induction machine is determined as the manipulated variable. The induction machine may then be an asynchronous machine having a squirrel-cage rotor, for example.

According to a further preferred embodiment of the present invention, an exciter current of the induction machine is determined as the manipulated variable. The induction machine may then be a separately excited synchronous machine, for example.

According to a further preferred embodiment of the present invention, the ohmic resistance of the stator of the induction machine is neglected in the calculation of the feedback variables. The calculation of the feedback variables is thus greatly simplified. Possible imprecision of the system modeling due to neglecting the stator resistance is advantageously compensated for by the control loop.

According to a further preferred embodiment of the present invention, a stationary state is assumed in the calculation of the feedback variables. The calculation of the feedback variables is also greatly simplified by this measure. Possible imprecision of the system modeling due to assuming a stationary state is advantageously compensated for by the control loop.

According to a further preferred embodiment of the present invention, the active and reactive power of the stator of the induction machine are regulated.

According to a further preferred embodiment of the present invention, the active and reactive power of the mains to which the induction machine is connected are regulated.

According to a further preferred embodiment of the present invention, the first regulator output variable is added to a feedback variable which corresponds to the cross product of rotor voltage and stator flux of the induction machine and the second regulator output variable is added to a feedback variable which corresponds to the scalar product of rotor voltage and stator flux. The cross and scalar products do not necessarily have to be calculated directly from the rotor voltage and the stator flux in this case, indirect calculation of the feedback variables via functions of the system variables of the induction machine which correspond to the cross and scalar products is also possible. The selection of the feedback variables according to this preferred embodiment of the present invention is especially suitable for a double-fed asynchronous machine in which the rotor voltage is used as the manipulated variable of the regulation.

Through the use of cross product and scalar product of rotor voltage and stator flux in the regulation according to the present invention, it is possible to dispense with the information about the pointer positions in relation to a specific coordinate system and allow simple regulator synthesis in spite of nonlinearity of the original system. The state of the machine is physically a function of the mutual position of the pointers which have been selected to describe the dynamics. The relationships between the pointers may also, however, be described by cross and scalar products without separate angle information. The design of the regulation may then occur in any arbitrary coordinate system fixed on the winding (e.g., fixed on the stator or rotor).

According to a further preferred embodiment of the present invention, the feedback variables are functions of at least the stator voltage, the stator flux, the rotor current, and the rotor speed. Generally, the feedback variables may not be calculated directly via the cross and scalar products of rotor voltage and stator flux, since the rotor voltage is used as the manipulated variable. However, the feedback variables may be derived from the state equations describing the state variables of the induction machine as functions of at least the stator voltage, the stator flux, the rotor current, and the rotor speed. These functions may additionally be a function of the inductivities of the induction machine and the stator resistance. The dependence of the feedback variables on stator voltage, stator flux, rotor current, and rotor speed results in the case of the double-fed asynchronous machine when the rotor voltage is used as the manipulated variable of the regulation, for example.

According to a further preferred embodiment of the present invention, the rotor voltage of the induction machine is determined as the manipulated variable, without further regulation, from the first and second regulator output variables added to the feedback variables and the stator flux. A procedure of this type is particularly advantageous for a double-fed asynchronous machine.

According to a further preferred embodiment of the present invention, at least the stator voltage and the rotor current of the induction machine are measured. A procedure of this type is particularly advantageous for a double-fed asynchronous machine. The measurement may be performed in natural three-phase coordinates, for example, and the measured variables may subsequently be transformed in a two-phase coordinate system.

According to a further preferred embodiment of the present invention, the stator current of the induction machine is measured. If there is no position sensor to measure the rotor position angle and the rotor speed, the measurement of the stator current may be necessary in order to allow a calculation of rotor position angle and rotor speed.

According to a further preferred embodiment of the present invention, the rotor speed of the induction machine is measured or determined from the stator voltage, the stator current, and the rotor current of the induction machine. The rotor speed may be measured via a position sensor, for example.

According to a further preferred embodiment of the present invention, the rotor position angle of the induction machine is measured or determined from the stator voltage, the stator current, and the rotor current of the induction machine. The rotor position angle may be measured via a position sensor, for example.

According to a further preferred embodiment of the present invention, the stator flux of the induction machine is calculated from the stator voltage and the angular frequency of the stator voltage of the induction machine.

According to a further preferred embodiment of the present invention, voltages and currents of the induction machine are each measured and then transformed in a two-phase coordinate system, and the manipulated variable is determined in a two-phase coordinate system and then transformed in a three-phase coordinate system. The voltages and currents of the induction machine are measured as natural three-phase variables in this case.

According to a further preferred embodiment of the present invention, the induction machine is a double-fed asynchronous machine, whose stator is connected directly to mains, and whose rotor is connected to an inverter. The inverter may contain two pulse-width-modulation inverters and an intermediate circuit, one of the pulse-width-modulation inverters may be connected to the rotor, and the other pulse-width-modulation inverter may be connected to the mains. The induction machine may, however, also be an asynchronous machine having a squirrel-cage rotor or a synchronous machine.

Furthermore, a computer program having commands whose execution causes a processor to perform the regulation method described above is suggested to achieve the object of the present invention. The regulation method presented is very well suitable for implementation on a processor which receives the setpoint variable deviations and the feedback variables as input variables and outputs the manipulated variable as the output variable, for example. The calculation of the feedback variables may also be implemented within the program if the processor is supplied with the required measured values of the currents, voltages, fluxes, and angular velocity of the induction machine. The computer program may be loaded into the main memory of the processor when the induction machine is put into operation and then executed, for example. Subsequent adaptation of the parameters of the regulators or possibly the feedback variables is advantageously possible.

Furthermore, a computer program product which contains a computer program having commands whose execution causes a processor to perform the regulation method described above is suggested to achieve the object of the present invention. The computer program product may be a replaceable data carrier, such as a memory card, a diskette, or a CD, for example, on which a computer program having the commands for executing the regulation method is stored.

Furthermore, a device for regulating the active and reactive power of an induction machine in a coordinate system fixed on the winding, having a first regulator for generating a first regulator output variable in the event of setpoint variable deviations of the active power, having a second regulator for generating a second regulator output variable in the event of setpoint variable deviations of the reactive power, and having means for adding the first and second regulator output variables to the particular feedback variables, which result as functions of at least one time changeable system variable of the induction machine, wherein the device comprises means for determining a voltage or a current of the induction machine as a manipulated variable from at least the first and second regulator output variables, added to the feedback variables, without further regulation, is suggested to achieve the object of the present invention.

The device according to the present invention may, for example, be a modular regulator unit having interfaces to input setpoint variable deviations and measured variables and to output the manipulated variables. Alternatively, the device may be permanently integrated into the induction machine. Because of the suitable selection of the feedback variables, the device requires only one regulator for regulating the active power and one regulator for regulating the reactive power, the regulator output variables being combined, after the corresponding feedback variables are applied, to determine the manipulated variable of the regulation.

According to a preferred embodiment of the present invention, the regulators are linear regulators.

According to a further preferred embodiment of the present invention, the regulators are PI regulators.

According to a further preferred embodiment of the present invention, the means for determining a voltage or a current of the induction machine determines a rotor voltage as the manipulated variable.

According to a further preferred embodiment of the present invention, the means for determining a voltage or a current of the induction machine determines a stator voltage as the manipulated variable.

According to a further preferred embodiment of the present invention, the means for determining a voltage or a current of the induction machine determines an exciter current as the manipulated variable.

According to a further preferred embodiment of the present invention, the active and reactive power of the stator of the induction machine are regulated.

According to a further preferred embodiment of the present invention, the active and reactive power of the mains to which the induction machine is connected are regulated.

According to a further preferred embodiment of the present invention, the regulator output variable of the first regulator is added to a feedback variable which corresponds to the cross product of rotor voltage and stator flux of the induction machine, and the regulator output variable of the second regulator is added to a feedback variable which corresponds to the scalar product of rotor voltage and stator flux.

According to a further preferred embodiment of the present invention, the feedback variables are functions of the stator voltage, the stator flux, the rotor current, and angular velocity of the rotor.

According to a further preferred embodiment of the present invention, the rotor voltage of the induction machine is determined as the manipulated variable from the first and second regulator output variables added to the feedback variables and the stator flux, without further regulation.

According to a further preferred embodiment of the present invention, the device comprises means for measuring the stator voltage and the rotor current of the induction machine.

According to a further preferred embodiment of the present invention, the device comprises means for measuring the stator current.

According to a further preferred embodiment of the present invention, the device comprises means for measuring the rotor speed of the induction machine or for determining it from the stator voltage, the stator current, and the rotor current of the induction machine.

According to a further preferred embodiment of the present invention, the device comprises means for measuring the rotor position angle of the induction machine or for determining it from the stator voltage, the stator current, and the rotor current of the induction machine.

According to a further preferred embodiment of the present invention, the device comprises means for measuring the voltages and currents of the induction machine and for transforming them in a two-phase coordinate system, and means for transforming the manipulated variable determined in a two-phase coordinate system in a three-phase coordinate system.

According to a further preferred embodiment of the present invention, the induction machine is a double-fed asynchronous machine, whose stator is connected directly to mains and whose rotor is connected to an inverter.

Furthermore, an induction machine having a device for regulating the active and reactive power of the induction machine in a coordinate system fixed on the winding according to the device features already described above is also suggested to achieve the object of the present invention.

In this case, the induction machine may be both an asynchronous machine having a squirrel-cage rotor or slip-ring rotor and a synchronous machine.

These and further aspects of the present invention will be explained on the basis of the following more detailed description of the preferred exemplary embodiments.

DETAILED DESCRIPTION OF THE INVENTION

The present invention relates to the regulation of the active and reactive power of induction machines. This regulation is explained in the following using the example of a double-fed asynchronous machine having an inverter in the rotor circuit. The regulation according to the present invention is also equally suitable, however, for other induction machines, in particular for asynchronous machines having squirrel-cage rotors and full inverters in the stator circuit and for synchronous machines.

Figure 1:
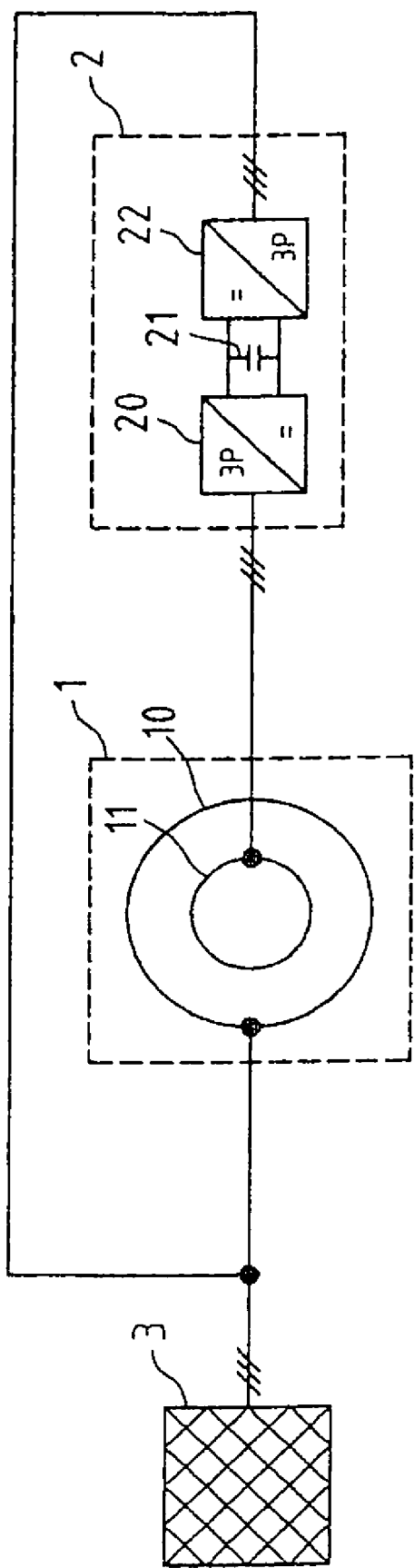
FIG. 1: shows a schematic illustration of a double-fed asynchronous machine on three-phase mains.

FIG. 1 shows an asynchronous machine 1 of this type, which comprises a stator 10 and a rotor 11. The rotor is connected directly or via a gear unit to a driveshaft and may thus alternately receive mechanical power (generator operation) or output mechanical power (motor operation).

The stator 10 in asynchronous machine 1 shown in FIG. 1 is connected directly to three-phase current mains 3, while the rotor 11 is connected via an inverter 2 to the three-phase mains 3. The inverter 2 comprises a mains-side pulse-width-modulation inverter 22 and a machine-side pulse-width-modulation inverter 20. A capacitor 21 is provided in the intermediate circuit to decouple the two pulse-width-modulation inverters 20 and 22, so that the slip power may be transmitted in both directions via the inverter 2. Because of the permanent connection of the stator 10 to the three-phase mains 3, the stator voltage is generally predefined by the mains (in amplitude and frequency), the separate mains form an exception here. A variable voltage having variable frequency is applied to the rotor 11 by the pulse-width-modulation inverter 20, through which different operating states (under-synchronous/over-synchronous operation and motor/generator operation) may be set. Receiving or outputting active power and reactive power by the asynchronous machine 1 may also be controlled correspondingly via the application of the rotor voltage.

The mathematical model of the asynchronous machine 1 shown in FIG. 1 may be represented in the following general form:

$$u_s = R_s i_s + \frac{d\psi_s}{d\tau} + j\omega_a \psi_s, \tag{1}$$

$$u_r = R_r i_r + \frac{d\psi_r}{d\tau} + j(\omega_a - \omega_r)\psi_r, \tag{2}$$

$$J\frac{d\omega_r}{d\tau} = \text{Im}|\psi_s i_s| - m_0. \tag{3}$$

In this case, $\psi_r$ and $\psi_s$ are the stator and rotor flux vectors, $i_s$ and $i_r$ are the stator and rotor current vectors, $u_s$ and $u_r$ are the stator and rotor voltage vectors, $R_s$ and $R_r$ are the stator and rotor winding resistances, $m_0$ is the torque, $J$ is the moment of inertia, $\omega_r$ is the rotor speed, $\omega_a$ is the rotational velocity of the reference coordinate system, and $\tau$ is the relative time. Here and in the following, bold letters identify vector variables, while, here and in the following, italicized letters identify scalar variables.

The following relationship exists between the currents and flux chains:

$$i_s = \frac{1}{L_s}\psi_s - \frac{L_m}{L_r}i_r, \tag{4}$$

$$i_r = \frac{1}{L_r}\psi_r - \frac{L_m}{L_r}i_s, \tag{5}$$

$L_s$, $L_r$, and $L_m$ identifying the stator inductivity, the rotor inductivity, and the counter inductivity.

Reforming the equations (1) through (5) results in a favorable form of the differential equation of the asynchronous machine:

$$\frac{d\psi_{s\alpha S}}{d\tau} = -\frac{R_s}{L_s}\psi_{s\alpha S} + R_s\frac{L_m}{L_s}i_{r\alpha S} + u_{s\alpha S}, \tag{6}$$

$$\frac{d\psi_{s\beta S}}{d\tau} = -\frac{R_s}{L_s}\psi_{s\beta S} + R_s\frac{L_m}{L_s}i_{r\beta S} + u_{s\beta S}, \tag{7}$$

$$\frac{di_{r\alpha S}}{d\tau} = -\frac{L_s^2 R_r + L_m^2 R_s}{L_s w_\sigma}i_{r\alpha S} + \tag{8}$$
$$\frac{R_s L_m}{L_s w_\sigma}\psi_{s\alpha S} - \frac{L_m}{w_\sigma}\omega_r\psi_{s\beta S} + \frac{L_s}{w_\sigma}u_{r\alpha S} - \frac{L_m}{w_\sigma}u_{s\alpha S},$$

-continued $$\frac{di_{r\beta S}}{d\tau} = -\frac{L_s^2 R_r + L_m^2 R_s}{L_s w_\sigma}i_{r\beta S} + \tag{9}$$
$$\frac{R_s L_m}{L_s w_\sigma}\psi_{s\beta S} + \frac{L_m}{w_\sigma}\omega_r\psi_{s\beta S} + \frac{L_s}{w_\sigma}u_{r\beta S} - \frac{L_m}{w_\sigma}u_{s\beta S},$$

$$\frac{d\omega_r}{d\tau} = \frac{L_m}{JL_s}(\psi_{s\alpha S}i_{r\beta S} - \psi_{s\beta S}i_{r\alpha S}) - \frac{1}{J}m_0. \tag{10}$$

In this case, the variable $w_\sigma$ is defined as $$w_\sigma = L_s L_r - L_m^2. \tag{11}$$

In the equations (6) through (10) and in the following, the first index identifies the location (r: rotor, s: stator), the second index indicates the particular components in a two-phase coordinate system ($\alpha$, $\beta$), and the third index identifies the reference system used (S: fixed on the stator winding, R: fixed on the rotor winding).

The present invention assumes the following selection of the state variables to describe the state of the asynchronous machine:

rotor speed $\omega_r$, stator active power $p_s$, stator reactive power $q_s$, and square of the stator flux $\psi_{sS}^2 = |\psi_{sS}|^2$.

The following relationship applies for the rotor speed $\omega_r$:

$$\frac{d\omega_r}{d\tau} = \frac{L_m}{JL_s}(\psi_{s\alpha S}i_{r\beta S} - \psi_{s\beta S}i_{r\alpha S}) - \frac{1}{J}m_0. \tag{12}$$

The instantaneous values of the generator power may be described using the equations (13) and (14):

$$p_s = u_{s\alpha S}i_{s\alpha S} + u_{s\beta S}i_{s\beta S}, \tag{13}$$

$$q = -u_{s\alpha S}i_{s\beta S} + u_{s\beta S}i_{s\alpha S}. \tag{14}$$

Assuming a stationary state, the generator powers may be represented as follows:

$$P_s = \frac{1}{L_s}(u_{s\alpha S}\psi_{s\alpha S} + u_{s\beta S}\psi_{s\beta S}) - \tag{15}$$
$$\frac{L_m}{L_s}\frac{(u_{s\beta S}\psi_{s\beta S} - u_{s\alpha S}\psi_{s\beta S})(\psi_{s\alpha S}i_{r\beta S} - \psi_{s\beta S}i_{r\alpha S})}{\psi_{sS}^2} +$$
$$\frac{L_m}{L_s}\frac{(u_{s\alpha S}\psi_{s\alpha S} + u_{s\beta S}\psi_{s\beta S})(\psi_{s\alpha S}i_{r\alpha S} + \psi_{s\beta S}i_{r\beta S})}{\psi_{sS}^2}$$

$$Q_s = -\frac{1}{L_s}(u_{s\beta S}\psi_{s\alpha S} - u_{s\alpha S}\psi_{s\beta S}) - \tag{16}$$
$$\frac{L_m}{L_s}\frac{(u_{s\beta S}\psi_{s\alpha S} - u_{s\alpha S}\psi_{s\beta S})(\psi_{s\alpha S}i_{r\alpha S} + \psi_{s\beta S}i_{r\beta S})}{\psi_{sS}^2} +$$
$$\frac{L_m}{L_s}\frac{(u_{s\alpha S}\psi_{s\alpha S} - u_{s\beta S}\psi_{s\beta S})(\psi_{s\alpha S}i_{r\beta S} + \psi_{s\beta S}i_{r\alpha S})}{\psi_{sS}^2}$$

By differentiating the equations (15) and (16) and by using the equations (6), (7), (8), and (9), the following differential equations are obtained after simplification:

$$\frac{dp_s}{d\tau} = -\frac{1}{T_v} p_s - \frac{L_s}{L_m} \frac{\psi_{sS}^2}{(u_{s\beta S}\psi_{s\alpha S} - u_{s\alpha S}\psi_{s\beta S})} \left[ -\frac{1}{T_v} \frac{u_{s\alpha S}\psi_{s\alpha S} + u_{s\beta S}\psi_{s\beta S}}{L_m(u_{s\beta S}\psi_{s\alpha S} - u_{s\alpha S}\psi_{s\beta S})} \psi_{sS}^2 + \frac{1}{T_v} \frac{u_{s\alpha S}\psi_{s\alpha S} + u_{s\beta S}\psi_{s\beta S}}{u_{s\beta S}\psi_{s\alpha S} - u_{s\alpha S}\psi_{s\beta S}} (\psi_{s\alpha S} i_{r\alpha S} + \psi_{s\beta S} i_{r\beta S}) + \omega_r (\psi_{s\alpha S} i_{r\alpha S} + \psi_{s\beta S} i_{r\beta S}) + \omega_r \frac{L_m}{w_\sigma} \psi_{sS}^2 + \frac{L_s}{w_\sigma} (u_{r\beta S}\psi_{s\alpha S} - u_{r\alpha S}\psi_{s\beta S}) - \frac{L_m}{w_\sigma} (u_{s\beta S}\psi_{s\alpha S} - u_{s\alpha S}\psi_{s\beta S}) + u_{s\alpha S} i_{r\beta S} - u_{s\beta S} i_{r\alpha S} \right] \quad (17)$$

$$\frac{dq_s}{d\tau} = -\frac{1}{T_v} q_s - \frac{L_s}{L_m} \frac{\psi_{sS}^2}{(u_{s\beta S}\psi_{s\alpha S} - u_{s\alpha S}\psi_{s\beta S})} \left[ -\frac{1}{T_v} \frac{\psi_{sS}^2}{L_m} + \frac{1}{T_v} \frac{u_{s\alpha S}\psi_{s\alpha S} + u_{s\beta S}\psi_{s\beta S}}{u_{s\beta S}\psi_{s\alpha S} - u_{s\alpha S}\psi_{s\beta S}} (\psi_{s\alpha S} i_{r\beta S} - \psi_{s\beta S} i_{r\alpha S}) + \frac{R_s L_m}{L_s w_\sigma} \psi_{sS}^2 + \frac{R_s L_m}{L_s} i_{sS}^2 - \omega_r (\psi_{s\alpha S} i_{r\beta S} - \psi_{s\beta S} i_{r\alpha S}) + \frac{L_s}{w_\sigma} (u_{r\alpha S}\psi_{s\alpha S} + u_{r\beta S}\psi_{s\beta S}) - \frac{L_m}{w_\sigma} (u_{s\alpha S}\psi_{s\alpha S} + u_{s\beta S}\psi_{s\beta S}) + u_{s\alpha S} i_{r\alpha S} + u_{s\beta S} i_{r\beta S} \right] \quad (18)$$

In this case $$T_v = \frac{w_\sigma}{R_s L_s + R_s L_r}. \quad (18a)$$

The square of the absolute value of the stator flux may be calculated as follows:

$$\psi_{sS}^2 = \psi_{s\alpha S}^2 + \psi_{s\beta S}^2. \quad (19)$$

The following differential equation is obtained by differentiating equation (19) and by using the equations (6) and (7):

$$\frac{d(\psi_{sS}^2)}{d\tau} = -2\frac{R_s}{L_s} \psi_{sS}^2 + 2\frac{R_s L_m}{L_s} (\psi_{s\alpha S} i_{r\alpha S} + \psi_{s\beta S} i_{r\beta S}) + 2(u_{s\alpha S}\psi_{s\alpha S} + u_{s\beta S}\psi_{s\beta S}) \quad (20)$$

The four state equations of the system, based on the selection of the four state variables according to the present invention, may then be summarized as follows:

$$\frac{d\omega_r}{d\tau} = \frac{L_m}{JL_s} (\psi_{s\alpha S} i_{r\beta S} - \psi_{s\beta S} i_{r\alpha S}) - \frac{1}{J} m_0, \quad (21)$$

$$\frac{dp_s}{d\tau} = -\frac{1}{T_v} p_s - \frac{L_s}{L_m} \frac{\psi_{sS}^2}{(u_{s\beta S}\psi_{s\alpha S} - u_{s\alpha S}\psi_{s\beta S})} \left[ -\frac{1}{T_v} \frac{u_{s\alpha S}\psi_{s\alpha S} + u_{s\beta S}\psi_{s\beta S}}{L_m(u_{s\beta S}\psi_{s\alpha S} - u_{s\alpha S}\psi_{s\beta S})} \psi_{sS}^2 + \frac{1}{T_v} \frac{u_{s\alpha S}\psi_{s\alpha S} + u_{s\beta S}\psi_{s\beta S}}{u_{s\beta S}\psi_{s\alpha S} - u_{s\alpha S}\psi_{s\beta S}} (\psi_{s\alpha S} i_{r\alpha S} + \psi_{s\beta S} i_{r\beta S}) + \omega_r (\psi_{s\alpha S} i_{r\alpha S} + \psi_{s\beta S} i_{r\beta S}) + \omega_r \frac{L_m}{w_\sigma} \psi_{sS}^2 + \frac{L_s}{w_\sigma} (u_{r\beta S}\psi_{s\alpha S} - u_{r\alpha S}\psi_{s\beta S}) - \frac{L_m}{w_\sigma} (u_{s\beta S}\psi_{s\alpha S} - u_{s\alpha S}\psi_{s\beta S}) + u_{s\alpha S} i_{r\beta S} - u_{s\beta S} i_{r\alpha S} \right] \quad (22)$$

$$\frac{dq_s}{d\tau} = -\frac{1}{T_v} q_s - \frac{L_s}{L_m} \frac{\psi_{sS}^2}{(u_{s\beta S}\psi_{s\alpha S} - u_{s\alpha S}\psi_{s\beta S})} \left[ -\frac{1}{T_v} \frac{\psi_{sS}^2}{L_m} + \frac{1}{T_v} \frac{u_{s\alpha S}\psi_{s\alpha S} + u_{s\beta S}\psi_{s\beta S}}{u_{s\beta S}\psi_{s\alpha S} - u_{s\alpha S}\psi_{s\beta S}} (\psi_{s\alpha S} i_{r\beta S} - \psi_{s\beta S} i_{r\alpha S}) + \frac{R_s L_m}{L_s w_\sigma} \psi_{sS}^2 + \frac{R_s L_m}{L_s} i_{sS}^2 - \omega_r (\psi_{s\alpha S} i_{r\beta S} - \psi_{s\beta S} i_{r\alpha S}) + \frac{L_s}{w_\sigma} (u_{r\alpha S}\psi_{s\alpha S} + u_{r\beta S}\psi_{s\beta S}) - \frac{L_m}{w_\sigma} (u_{s\alpha S}\psi_{s\alpha S} + u_{s\beta S}\psi_{s\beta S}) + u_{s\alpha S} i_{r\alpha S} + u_{s\beta S} i_{r\beta S} \right] \quad (23)$$

$$\frac{d(\psi_{sS}^2)}{d\tau} = -2\frac{R_s}{L_s} \psi_{sS}^2 + 2\frac{R_s L_m}{L_s} (\psi_{s\alpha S} i_{r\alpha S} + \psi_{s\beta S} i_{r\beta S}) + 2(u_{s\alpha S}\psi_{s\alpha S} + u_{s\beta S}\psi_{s\beta S}). \quad (24)$$

Through the selection according to the present invention of rotor speed $\omega_r$, stator active power $p_s$, stator reactive power $q_s$, and square of the stator flux $\psi_{sS}^2$ as state variables, the regulation according to the present invention of the active and reactive power may be performed using only two regulators, one for the active power and one for the reactive power, since the active and reactive power are direct state variables. Therefore, subordinate control loops may be dispensed with and an especially simple construction of the regulation is possible. Furthermore, the necessity of an angle transformation in the control loops is dispensed with, so that the design of the regulation may be performed in an arbitrary coordinate system.

However, the differential equations (22) and (23) are not suitable for the regulator design because of the strong nonlinearity. Therefore, according to the present invention, the system of the state equations is reformed in such a way that the active and reactive power form a linear element in the system matrix. However, the system may obtain a strongly nonlinear character through the transformation of the system state representation. This nonlinear behavior is compensated for in turn by nonlinear feedback elements. In the optimum case, the newly defined system is to receive a first-order low-pass behavior in each case for the active power and the reactive power. The time constants of these low-pass behaviors are a function of the state matrix of the newly defined system. Two linear regulators, e.g., two PI regulators may then be used for the newly defined system.

The desired linearization of the state equations is achieved by the definition of the variables:

$$v_1 = u_{r\beta S}\psi_{s\alpha S} - u_{r\alpha S}\psi_{s\beta S} = \qquad (25)$$

$$-\frac{\psi_{sS}^2}{(u_{s\beta S}\psi_{s\alpha S} - u_{s\alpha S}\psi_{s\beta S})}\frac{w_\sigma}{L_s}\left(-\frac{1}{T_v}\frac{u_{s\alpha S}\psi_{s\alpha S} + u_{s\beta S}\psi_{s\beta S}}{L_m(u_{s\beta S}\psi_{s\alpha S} - u_{s\alpha S}\psi_{s\beta S})}\psi_{sS}^2 + \right.$$

$$\frac{1}{T_v}\frac{u_{s\alpha S}\psi_{s\alpha S} + u_{s\beta S}\psi_{s\beta S}}{(u_{s\beta S}\psi_{s\alpha S} - u_{s\alpha S}\psi_{s\beta S})}(\psi_{s\alpha S}i_{r\alpha S} + \psi_{s\beta S}i_{r\beta S}) +$$

$$\omega_r\left((\psi_{s\alpha S}i_{r\alpha S} + \psi_{s\beta S}i_{r\beta S}) + \frac{L_m}{w_\sigma}\psi_{sS}^2\right) -$$

$$\left.\frac{L_m}{w_\sigma}(u_{s\beta S}\psi_{r\alpha S} - u_{s\alpha S}\psi_{s\beta S}) + u_{s\alpha S}i_{r\beta S} - u_{s\beta S}i_{r\alpha S} + s_1\right)$$

and $$v_2 = u_{r\alpha S}\psi_{s\alpha S} + u_{r\beta S}\psi_{s\beta S} = -\frac{w_\sigma}{L_m}\frac{\psi_{s\beta}^2}{(u_{s\beta S}\psi_{s\alpha S} - u_{s\alpha S}\psi_{s\beta S})} \qquad (26)$$

$$\begin{pmatrix} -\frac{1}{T_v}\frac{\psi_{sS}^2}{L_m} + \frac{1}{T_v}\frac{u_{s\alpha S}\psi_{s\alpha S} + u_{s\beta S}\psi_{s\beta S}}{(u_{s\beta S}\psi_{s\alpha S} - u_{s\alpha S}\psi_{s\beta S})} \\ (\psi_{s\alpha S}i_{r\beta S} - \psi_{s\beta S}i_{r\alpha S}) + \frac{R_s L_m}{L_s w_\sigma}\psi_{sS}^2 + \frac{R_s L_m}{L_s}i_{sS}^2 - \\ \omega_r(\psi_{s\alpha S}i_{r\beta S} - \psi_{s\beta S}i_{r\alpha S}) - \frac{L_m}{w_\sigma} \\ (u_{s\alpha S}\psi_{s\alpha S} + u_{s\beta S}\psi_{s\beta S}) + u_{s\alpha S}i_{r\alpha S} + u_{s\beta S}i_{r\beta S} + s_2 \end{pmatrix}$$

the variables $s_1$ and $s_2$ being newly introduced in order to allow a regulation of the system.

Obviously, in this case $v_1$ from equation (25) corresponds to the cross product of rotor voltage and stator flux and $v_2$ from equation (26) corresponds to the scalar product of rotor voltage and stator flux. The selection of the state variables and these variables $v_1$ and $v_2$ allows the information about the pointer position to be dispensed with in the regulation according to the present invention, through which regulation in a coordinate system fixed on the winding is made possible, and makes simple regulators possible in spite of nonlinearity. The state of the asynchronous machine 1 is physically a function of the mutual position of the pointers which have been selected to describe the dynamics. The relationships between pointers may also be described without separate angle information by cross and scalar products, however. The state vectors according to the present invention were therefore selected in such a way that a description through cross and scalar products is possible.

Since the rotor voltage $u_{rS}$ (described by the components $u_{r\alpha S}$ and $u_{r\beta S}$) in the equations (25) and (26) is the manipulated variable of the regulation, the variables $v_1$ and $v_2$ may not be calculated directly via the definition of the cross and scalar products from rotor voltage and stator flux (compare the first line of each of the equations (25) and (26)). However, the cross and scalar products may be expressed by system variables according to each of the second lines of the equations (25) and (26) and thus calculated indirectly.

By using the variables $v_1$ and $v_2$ according to the equations (25) and (26) in the equations (22) and (23), the state equations are linearized as desired, which may be summarized as follows:

$$\frac{d\omega_r}{d\tau} = \frac{L_m}{JL_s}(\psi_{s\alpha S}i_{r\beta S} - \psi_{s\beta S}i_{r\alpha S}) - \frac{1}{J}m_0, \qquad (27)$$

$$\frac{dp_s}{d\tau} = -\frac{1}{T_v}p_s + s_1, \qquad (28)$$

$$\frac{dq_s}{d\tau} = -\frac{1}{T_v}q_s + s_2, \qquad (29)$$

$$\frac{d(\psi_{sS}^2)}{d\tau} = -2\frac{R_s}{L_s}\psi_{sS}^2 + \qquad (30)$$

$$2\frac{R_s L_m}{L_s}(\psi_{s\alpha S}i_{r\alpha S} + \psi_{s\beta S}i_{r\beta S}) + 2(u_{s\alpha S}\psi_{s\alpha S} + i_{s\beta S}\psi_{s\beta S}).$$

The equations (27) through (30) are used directly for synthesizing the regulation according to the present invention.

Figure 2:
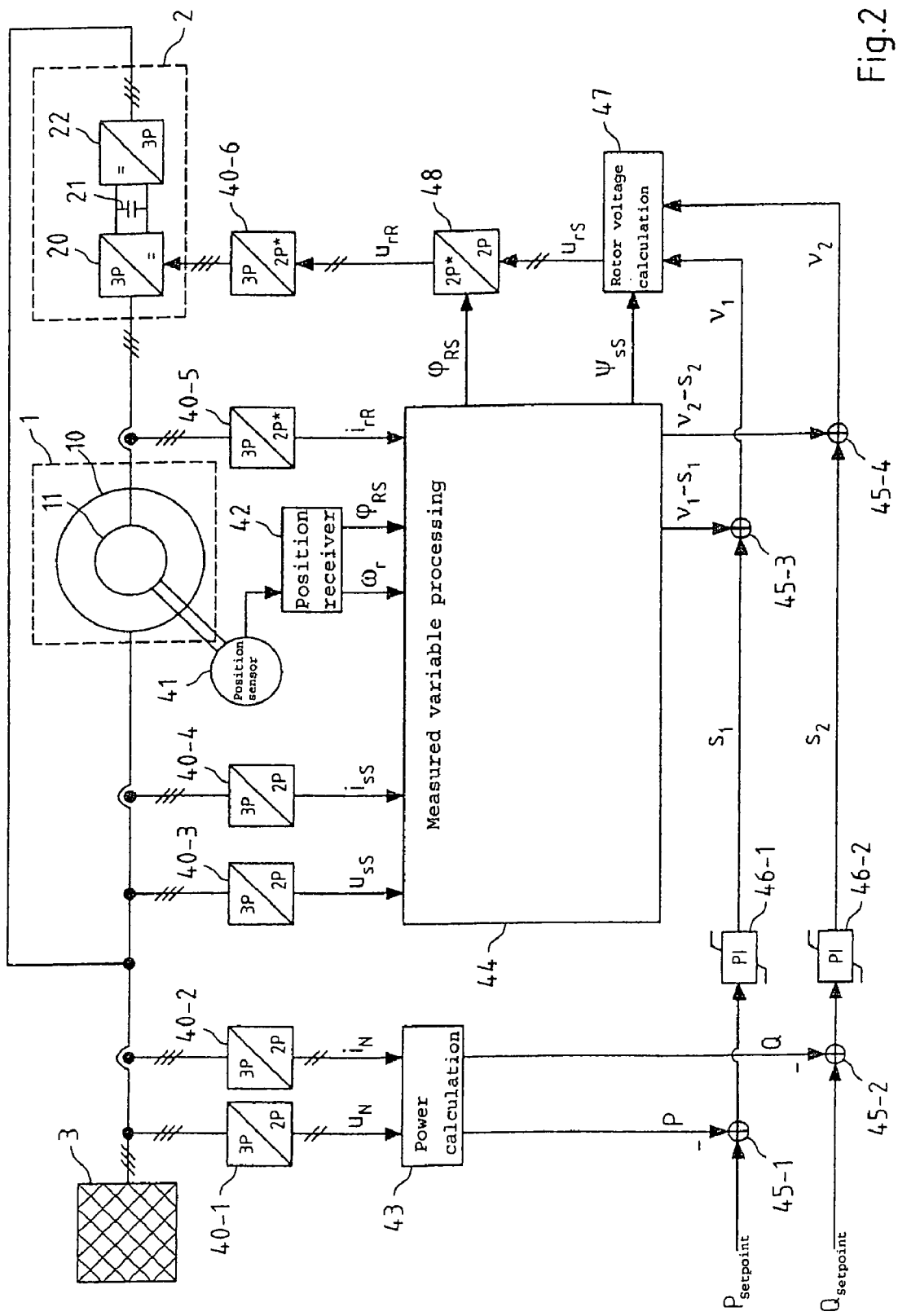
FIG. 2: shows a schematic illustration of the regulation according to the present invention of the active and reactive power of the double-fed asynchronous machine in FIG. 1.

FIG. 2 shows a schematic illustration of this regulation. The double-fed asynchronous machine 1 having stator 10 and rotor 11, the feeding mains 3 and the inverter 2 are shown again.

In this system, different voltages and currents are measured and used for regulation to perform the regulation according to the present invention of the active and reactive power. Specifically, these are the mains voltage $u_N$, the mains current $i_N$, the stator voltage $u_{sS}$, and the rotor current $i_{rR}$. These voltages and currents are measured in natural three-phase coordinates and subsequently transferred using transformation units 40-1, 40-2, 40-3, and 40-5 into a two-phase coordinate system fixed on the stator or rotor. For example, the stator voltage fixed on the rotor $u_{sS}$ is then provided in two components $u_{s\alpha S}$ and $u_{s\beta S}$ (correspondingly for the remaining voltages and currents).

Furthermore, the stator current may optionally $i_{sS}$ be measured and transferred using a transformation unit 40-4 into a two-phase coordinate system fixed on the stator, in order to allow a calculation of the rotor speed $\omega_r$ and the rotor position angle $\phi_{RS}$ between rotor and stator.

Alternatively to this procedure, the rotor speed $\omega_r$ and the rotor position angle $\phi_{RS}$ between rotor and stator may be measured on the basis of an optional position sensor 41 and an optional position receiver 42, a measurement of the stator current is then not necessary.

The actual active power P and the actual reactive power Q are calculated from the mains voltage $u_N$ and the mains current $i_N$ in a power calculation unit 43 and supplied with a negative sign to the adders 45-1 and 45-2, in order, through subtraction of the externally predefined setpoint active powers $P_{Soll}$ and setpoint reactive powers $Q_{Soll}$, to generate a setpoint variable deviation of the active power and the setpoint variable deviation of the reactive power at the output of the adders 45-1 and 45-2, respectively. In FIG. 2, the regulation is shown starting from the mains powers as actual variables. However, it is possible without anything further to pass over to stator powers instead of the mains powers as the actual variables.

The measured variables $u_{sS}$ and $i_{rR}$, which are subsequently transformed in a two-phase coordinate system, and alternately the measured variables $\omega_r$ and $\phi_{RS}$ or the measured variable $i_{sS}$, subsequently transformed in a two-phase coordinate system, which is necessary for calculating $\omega_r$ and $\phi_{RS}$, are supplied to the measured variable processing unit 44, which outputs the output variables of rotor position angle $\phi_{RS}$, stator flux fixed on the stator $\psi_{sS}$, and the feedback variables $v_1$-$s_1$ and $v_2$-$s_2$ according to the equations (25) and (26), at least partially as a function of these variables. The calculation of these output variables will be discussed in greater detail in connection with the description of FIG. 3.

The regulation according to the present invention illustrated in FIG. 2 uses the two PI regulators 46-1 and 46-2 in order to generate regulator output variables $s_1$ and $s_2$ as a function of setpoint variable deviations of the active power and the reactive power. The regulator output variables $s_1$ and $s_2$ are supplied separately to the adders 45-3 and 45-4, through which they are added to the feedback variables $v_1-s_1$ and $v_1-s_2$ by addition, which have been determined by the measured variable processing unit 44 from the instantaneous system state of the asynchronous machine 1. The variables $v_1$ and $v_2$ are then provided at the output of the adders 45-3 and 45-4, which are supplied to the unit 47 for the calculation of the rotor voltage.

The unit 47 receives the stator flux fixed on the stator $\psi_{sS}$ as an additional input variable and determines the rotor voltage fixed on the stator $u_{rS}$ required to achieve the predefined active power $P_{Soll}$ and the predefined reactive power $Q_{Soll}$ (in a two-phase coordinate system) according to the following equations:

$$u_{r\alpha S} = \frac{-v_1 \psi_{s\beta S} + v_2 \psi_{s\alpha S}}{\psi_{sS}^2}, \quad (31)$$

$$u_{r\beta S} = \frac{v_2 \psi_{s\beta S} + v_1 \psi_{s\alpha S}}{\psi_{sS}^2}. \quad (32)$$

The transformation of the rotor voltage from the coordinate system fixed on the stator in the coordinate system fixed on the rotor is performed in the transformation unit 48, which receives the rotor position angle $\phi_{RS}$ as an additional input variable from the measured variable processing unit 44, according to the following guidelines:

$$u_{r\alpha R} = u_{r\alpha S} \cos \phi_{RS} - u_{r\beta S} \sin \phi_{RS}, \quad (33)$$

$$u_{r\beta R} = u_{r\alpha S} \sin \phi_{RS} + u_{r\beta S} \cos \phi_{RS}. \quad (34)$$

Finally, the rotor voltage fixed on the rotor is transformed from the two-phase coordinate system in the three-phase coordinate system by the transformation unit 40-6 and applied to the rotor 11 of the asynchronous machine 1 via the machine-side pulse-width-modulation inverter 20 of the inverter 2.

The regulation according to the present invention requires only the two PI regulators 46-1 and 46-2 in order to regulate the stationary setpoint value deviation of the active power and the reactive power with in sufficient time frame. For this purpose, the parameters of the PI regulators, particularly the time constants of the PI regulators, are adapted to the parameters of the asynchronous machine 1, as are reflected in the state equations.

Figure 3:
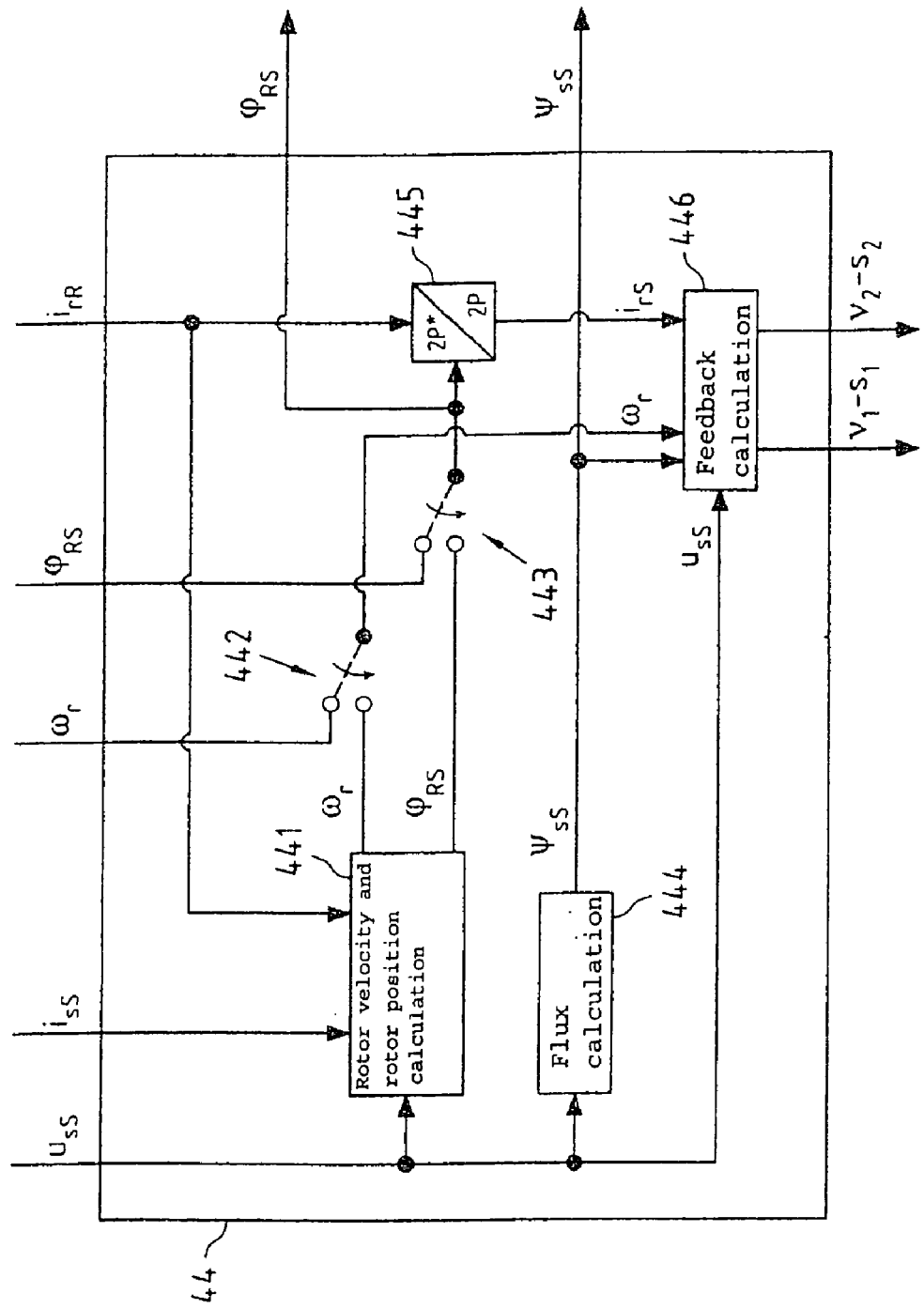
FIG. 3: shows a schematic illustration of the measured variable processing unit 44 from FIG. 2.

The schematic construction of the measured variable processing unit 44 from FIG. 2 is illustrated in FIG. 3. As input variables, the measured variable processing unit 44 receives the measured variables of stator voltage fixed on the stator $u_{sS}$, rotor current fixed on the rotor $i_{rR}$, and alternately the stator current fixed on the stator $i_{sS}$ or the rotor speed $\omega_r$ and the rotor position angle $\phi_{RS}$, which are subsequently transformed in a corresponding two-phase coordinate system, and outputs the rotor position angle $\phi_{RS}$, the stator flux fixed on the stator $\psi_{sS}$, and the feedback variables $v_1-s_1$ and $v_2-s_2$ as a function of these input variables.

As already indicated, the rotor speed $\omega_r$ and the rotor position angle $\phi_{RS}$ may optionally be measured using the position sensor 41 and the position receiver 42 from FIG. 2. Alternatively, rotor speed and rotor position angle may be estimated in the measured variable processing unit 44 from the stator voltage fixed on the stator $u_{sS}$, the stator current fixed on the stator $i_{sS}$, and the rotor current fixed on the rotor $i_{rR}$, which is then implemented in the unit 441. The particular measured/estimated rotor speed $\omega_r$ and measured/estimated rotor position angle $\phi_{RS}$ may then be selected using the switches 442 and 443. Of course, one of the two options of measurement/estimation may also be completely dispensed with for reasons of cost.

The rotor position angle $\phi_{RS}$ is then used for the transformation of the rotor current fixed on the rotor $i_{rR}$ to the rotor current fixed on the stator $i_{rS}$ in the transformation unit 445 and, in addition, output by the measured variable processing unit 44 to the transformation unit 48 from FIG. 2.

Furthermore, the measured variable processing unit 44 comprises a unit 444 for calculating the stator flux fixed on the stator $\psi_{sS}$. The calculation may be performed according to an arbitrary method in this case. For example, the stator flux may be represented in the following form after conversion of the equation (4):

$$\psi_{s\alpha S} = i_{s\alpha S} L_s + i_{r\alpha S} L_m, \quad (35)$$

$$\psi_{s\beta S} = i_{s\beta S} L_s + i_{r\beta S} L_m. \quad (36)$$

The method as described above for calculating the stator flux may result in problems because of saturation effects of the machine or due to the type of the measurement converter. Therefore, it is advantageous to use another method. In induction machines having high power, the stator resistance $R_s$ may be neglected. The equation (1) then assumes the following form:

$$\frac{d\psi_s}{d\tau} = u_s. \quad (37)$$

The following relationship then results from equation (37) in the stationary case for the components of the stator flux:

$$\psi_{s\alpha S} = -\frac{u_{s\beta S}}{\omega_s}, \quad (38)$$

$$\psi_{s\beta S} = \frac{u_{s\alpha S}}{\omega_s}. \quad (39)$$

In this case, $\omega_s$ is the angular frequency of the stator voltage.

The calculation of the feedback variables $v_1-s_1$ and $v_2-s_2$ is finally performed in the unit 446 as a function of $u_{sS}$, $\psi_{sS}$, $i_{rS}$, and $\omega_r$.

In a first preferred embodiment of the present invention, the feedback variables are calculated according to the equations (25) and (26).

In a second preferred embodiment, the stator resistance $R_s$ is neglected to derive the equations for the feedback variables. This assumption is justified in large machines, for example. In this case, it may be assumed that the stator voltage and the stator flux are perpendicular to one another. If one further assumes a stationary state and considers that related variables are used for calculation, the following relationships result:

$$\psi_{sS}^2 \approx 1, \quad (40)$$

$$u_{s\alpha S}\psi_{s\alpha S} + u_{s\beta S}\psi_{s\beta S} \approx 0, \quad (41)$$

$$u_{s\beta S}\psi_{s\alpha S} - u_{s\alpha S}\psi_{s\beta S} \approx 1. \quad (42)$$

The consideration of the equations (40), (41), and (42) results in simplification of the equations (22) and (23). These may then be represented in the following form:

$$\frac{dp_s}{d\tau} = -\frac{1}{T_v} p_s - \frac{L_s}{L_m} \begin{bmatrix} \omega_r \left( (\psi_{s\alpha S} i_{r\alpha S} + \psi_{s\beta S} i_{r\beta S}) + \frac{L_m}{w_\sigma} \psi_{sS}^2 \right) + \\ \frac{L_s}{w_\sigma}(u_{r\beta S}\psi_{s\alpha S} - u_{r\alpha S}\psi_{s\beta S}) - \\ \frac{L_m}{w_\sigma}(u_{s\beta S}\psi_{s\alpha S} - u_{s\alpha S}\psi_{s\beta S}) + \\ u_{s\alpha S} i_{r\beta S} - u_{s\beta S} i_{r\alpha S} \end{bmatrix} \quad (43)$$

$$\frac{dq_s}{d\tau} = -\frac{1}{T_v} q_s - \frac{L_s}{L_m} \begin{bmatrix} -\frac{1}{T_v L_m} + \frac{R_s L_m}{L_s w_\sigma} \psi_{sS}^2 + \frac{R_s L_m}{L_s} i_{rS}^2 - \omega_r \\ (\psi_{s\alpha S} i_{r\beta S} - \psi_{s\beta S} i_{r\alpha S}) + \frac{L_s}{w_\sigma} \\ (u_{r\alpha S}\psi_{s\alpha S} + u_{r\beta S}\psi_{s\beta S}) + \\ u_{s\alpha S} i_{r\alpha S} + u_{s\beta S} i_{r\beta S} \end{bmatrix} \quad (44)$$

If one also introduces feedback here to linearize the differential equations (43) and (44), as in the first preferred embodiment, the state equations according to the equations (27) through (30) are again obtained, but with the altered variables $$v_1^* = u_{r\beta S}\psi_{s\alpha S} - u_{r\alpha S}\psi_{s\beta S} = -\frac{w_\sigma}{L_s} \quad (45)$$

$$\left( \omega_r \left( (\psi_{s\alpha S} i_{r\alpha S} + \psi_{s\beta S} i_{r\beta S}) + \frac{L_m}{w_\sigma} \psi_{sS}^2 \right) - \\ \frac{L_m}{w_\sigma}(u_{s\beta S}\psi_{s\alpha S} - u_{s\alpha S}\psi_{s\beta S}) + u_{s\alpha S} i_{r\beta S} - u_{s\beta S} i_{r\alpha S} + s_1 \right)$$

and $$v_2^* = u_{r\alpha S}\psi_{s\alpha S} + u_{r\beta S}\psi_{s\beta S} = \quad (46)$$

$$-\frac{w_\sigma}{L_m}\left( -\frac{1}{T_v L_m} - \omega_r(\psi_{s\alpha S} i_{r\beta S} - \psi_{s\beta S} i_{r\alpha S}) + u_{s\alpha S} i_{r\alpha S} + u_{s\beta S} i_{r\beta S} + s_2 \right)$$

The single difference from the first preferred embodiment is thus a different calculation of the feedback in the unit 446 of the measured variable processing unit 44. The remaining structure of the regulation according to the present invention shown in FIGS. 2 and 3 is maintained.

Through the simplification of the feedback variables from the equations (45) and (46) according to the second preferred embodiment of the present invention, the feedback may be calculated cost-effectively in comparison to the first preferred embodiment and the regulation may thus be performed with less complexity and more rapidly. Model deviations due to the assumption of a negligible stator resistance are compensated for in this case, like all other interfering variables of the system, by the regulation, so that in the second preferred embodiment, there is no loss in the quality or stability of the regulation.

In a third preferred embodiment, a stationary state is finally assumed in the derivation of the feedback. The equations (6) and (7) may then be simplified as follows:

$$0 = -\frac{R_s}{L_s}\psi_{s\alpha S} + R_s \frac{L_m}{L_s} i_{r\alpha S} + u_{s\alpha S}, \quad (47)$$

$$0 = -\frac{R_s}{L_s}\psi_{s\beta S} + R_s \frac{L_m}{L_s} i_{r\beta S} + u_{s\beta S}. \quad (48)$$

The equations (47) and (48) are first multiplied by $\psi_{s\alpha S}$ and $\psi_{s\beta S}$. The equations thus resulting are subtracted once and added once. The following equations are thus obtained:

$$u_{s\beta S}\psi_{s\alpha S} - u_{s\alpha S}\psi_{s\beta S} = \psi_{sS}^2 + \frac{R_s L_m}{L_s}(\psi_{s\alpha S} i_{r\beta S} + \psi_{s\beta S} i_{r\alpha S}), \quad (49)$$

$$u_{s\alpha S}\psi_{s\alpha S} + u_{s\beta S}\psi_{s\beta S} = \frac{R_s}{L_s}\psi_{sS}^2 - \frac{R_s L_m}{L_s}(\psi_{s\alpha S} i_{r\alpha S} + \psi_{s\beta S} i_{r\beta S}). \quad (50)$$

The following power equations of the induction machine result through the use of the equations (49) and (50) in the equations (15) and (16):

$$P_s = \frac{U_s^2}{R_s} - \frac{\psi_s^2}{R_s} - \frac{L_m}{L_s}(\psi_{s\alpha S} i_{r\beta S} + \psi_{s\beta S} i_{r\alpha S}), \quad (51)$$

$$Q_s = \frac{\psi_s^2}{L_s} - \frac{L_m}{L_s}(\psi_{s\alpha S} i_{r\alpha S} + \psi_{s\beta S} i_{r\beta S}). \quad (52)$$

The following differential equations are obtained after simplification by differentiating the equations (51) and (52) and by using the equations (6) through (9):

$$\frac{dp_s}{d\tau} = -\frac{1}{T_v} p_s - \frac{L_m}{L_s} \quad (53)$$

$$\left[ \omega_r \left( (\psi_{s\alpha S} i_{r\alpha S} + \psi_{s\beta S} i_{r\beta S}) + \frac{L_m}{w_\sigma} \psi_{sS}^2 \right) + \frac{L_s}{w_\sigma}(u_{r\beta S}\psi_{s\alpha S} - u_{r\alpha S}\psi_{s\beta S}) - \\ \frac{L_m}{w_\sigma}(u_{s\beta S}\psi_{s\alpha S} - u_{s\alpha S}\psi_{s\beta S}) + u_{s\alpha S} i_{r\beta S} - u_{s\beta S} i_{r\alpha S} \right]$$

$$\frac{dq_s}{d\tau} = -\frac{1}{T_v} q_s - \frac{L_s}{L_m}\left[ \frac{R_s L_m}{L_s w_\sigma}\psi_{sS}^2 + \frac{R_s L_m}{L_s} i_{rS}^2 - \quad (54) \right.$$

$$\omega_r(\psi_{s\alpha S} i_{r\beta S} + \psi_{s\beta S} i_{r\alpha S}) + \frac{L_s}{w_\sigma}(u_{r\alpha S}\psi_{s\alpha S} - u_{r\beta S}\psi_{s\beta S}) -$$

$$\left. \frac{L_m}{w_\sigma}(u_{s\alpha S}\psi_{s\alpha S} + u_{s\beta S}\psi_{s\beta S}) + u_{s\alpha S} i_{r\alpha S} + u_{s\beta S} i_{r\beta S} \right]$$

If, as in the first and second preferred embodiments, feedback is also introduced to linearize the differential equations (53) and (54), the state equations according to the equations (27) through (30) are again obtained, but with the changed variables $$v_1^{**} = u_{r\beta S}\psi_{s\alpha S} - u_{r\alpha S}\psi_{s\beta S} \quad (55)$$

$$= -\frac{w_\sigma}{L_m}\left( \omega_r \left( (\psi_{s\alpha S} i_{r\alpha S} + \psi_{s\beta S} i_{r\beta S}) + \frac{L_m}{w_\sigma} \psi_{sS}^2 \right) - \\ \frac{L_m}{w_\sigma}(u_{s\beta S}\psi_{s\alpha S} - u_{s\alpha S}\psi_{s\beta S}) + u_{s\alpha S} i_{r\beta S} - u_{s\beta S} i_{r\alpha S} + s_1 \right)$$

and

-continued $$v_2^{**} = u_{r\alpha S}\psi_{s\alpha S} + u_{r\beta S}\psi_{s\beta S} \quad (56)$$
$$= -\frac{w_\sigma}{L_m}\left(\frac{R_s L_m}{L_s w_\sigma}\psi_{sS}^2 + \frac{R_s L_m}{L_s}i_{rS}^2 - \omega_r(\psi_{s\alpha S}i_{r\beta S} + \psi_{s\beta S}i_{r\alpha S}) - \frac{L_m}{w_\sigma}(u_{s\alpha S}\psi_{s\alpha S} + u_{s\beta S}\psi_{s\beta S}) + u_{s\alpha S}i_{r\alpha S} + u_{s\beta S}i_{r\beta S} + s_2\right)$$

The single difference to the first and second preferred embodiments is again a different calculation of the feedback in the unit 446 of the measured variable processing unit 44. The remaining structure of the regulation according to the present invention shown in FIGS. 2 and 3 is maintained.

Through the simplification of the feedback variables from the equations (55) and (56) according to the third preferred embodiment of the present invention, the feedback may be calculated more cost-effectively in comparison to the first preferred embodiment and the regulation may thus be performed less complexly and more rapidly. Model deviations due to the assumption of a stationary system state are compensated for in this case, like all other interfering variables of the system, by the regulation, so that no loss in the quality or stability of the regulation of the system results in the third preferred embodiment as well.

The present invention was described on the basis of preferred embodiments. Multiple variations of the regulation according to the present invention result through use of different simplifications in the derivation of the state equations. Regulation of this type is distinguished by great precision and dynamism. No transformation of the measured variables to a specific reference system is necessary for controlling the inverter. The coordinate system may thus be selected freely. For the sake of simplicity, for example, a coordinate system fixed on the stator may be selected.

The invention claimed is:

1. A method for regulating active and reactive power of an induction machine in a coordinate system fixed on a winding comprising the steps of:
    generating a first regulator output variable using a first regulator as a function of a setpoint value deviation of the active power and a second regulator output variable using a second regulator as a function of a setpoint value deviation of the reactive power, and
    adding the first and the second regulator output variables to respective feedback variables, which are functions of at least one time changeable system variable of the induction machine,
    wherein a voltage or a current of the induction machine is determined as a manipulated variable at least from the first and second regulator output variables, which have been added to the feedback variables, without an additional subordinate control loop, and
    wherein the feedback variables are selected in such a way that the reactive and active powers are at least partially decoupled.

2. The method according to claim 1, wherein the regulators are linear regulators.

3. The method according to claim 1, wherein the regulators are PI regulators.

4. The method according to claim 1, wherein a rotor voltage of the induction machine is determined as the manipulated variable.

5. The method according to claim 1, wherein a stator voltage of the induction machine is determined as the manipulated variable.

6. The method according to claim 1, wherein an exciter current of the induction machine is determined as the manipulated variable.

7. The method according to claim 1, wherein ohmic resistance of a stator of the induction machine is neglected when calculating the feedback variables.

8. The method according to claim 1, wherein a stationary state is assumed when calculating the feedback variables.

9. The method according to claim 1, wherein the active and reactive power of the stator of the induction machine is regulated.

10. The method according to claim 1, wherein active and reactive power of mains (3) to which the induction machine is connected are regulated.

11. The method according to claim 1, wherein the first regulator output variable is added to a feedback variable that corresponds to a cross product of rotor voltage and stator flux of the induction machine, and the second regulator output variable is added to a feedback variable that corresponds to a scalar product of rotor voltage and stator flux.

12. The method according to claim 1, wherein the feedback variables are functions of at least stator voltage, stator flux, rotor current, and rotor speed.

13. The method according to claim 1, wherein rotor voltage of the induction machine is determined as manipulated variable, without further regulation, from the first and second regulator output variables added to the feedback variables and the stator flux.

14. The method according to claim 1, wherein at least the stator voltage and the rotor current of the induction machine are measured.

15. The method according to claim 1, wherein the stator current of the induction machine is measured.

16. The method according to claim 1, wherein rotor speed of the induction machine is measured or determined from stator voltage, stator current, and rotor current of the induction machine.

17. The method according to claim 1, wherein rotor position angle of the induction machine is measured or determined from stator voltage, stator current, and rotor current of the induction machine.

18. The method of claim 1, wherein the stator flux of the induction machine is calculated from the stator and the angular frequency of the stator voltage of the induction machine.

19. The method according to claim 1, wherein voltages and currents of the induction machine are each measured and then transformed in a two-phase coordinate system, and the manipulated variable is determined in a two-phase coordinate system and then transformed in a three-phase coordinate system.

20. The method according to claim 1, wherein the induction machine is a double-fed asynchronous machine, whose stator is directly connected to mains, and whose rotor is connected to an inverter.

21. A computer program having commands whose execution causes a processor to perform the method according to claim 1.

22. A computer program product containing a computer program having commands whose execution causes a processor to perform the method according to claim 1.

23. A device for regulating active and reactive power of an induction machine in a coordinate system fixed on a winding comprising:
    a first regulator for generating a first regulator output variable in the event of setpoint variable deviations of the active power, a second regulator for generating a second regulator output variable in the event of setpoint variable deviations of the reactive power, a means for adding each of the first and second regulator output variables to feedback variables, wherein the feedback variables result as functions from at least one time changeable system variable of the induction machine, and a means, which does not have any further subordinate control loops, for determining a voltage or a current of the induction machine as a manipulated variable from at least the first and second regulator output variables added to the feedback variables, wherein the active and reactive power can be at least partially decoupled via the means for applying feedback variables to the first and second regulator output variables through the selection of the feedback variables.

24. The device according to claim 23, wherein the regulators are linear regulators.

25. The device according to claim 23, wherein the regulators are PI regulators.

26. The device according to claim 23, wherein the means for determining a voltage or a current of the induction machine determines a rotor voltage as the manipulated variable.

27. The device according to claim 23, wherein the means for determining a voltage or a current of the induction machine determines a stator voltage as the manipulated variable.

28. The device according to claim 23, wherein the means for determining a voltage or a current of the induction machine determines an exciter current as the manipulated variable.

29. The device according to claim 23, wherein the active and reactive power of the stator of the induction machine are regulated.

30. The device according to claim 23, wherein the active and reactive power of the mains to which the induction machine is connected are regulated.

31. The device according to claim 23, wherein the regulator output variable of the first regulator is added to a feedback variable that corresponds to a cross product of rotor voltage and stator flux of the induction machine, and the regulator output variable of the second regulator is added to a feedback variable that corresponds to a scalar product of rotor voltage and stator flux.

32. The device according to claim 23, wherein the feedback variables are functions of at least stator voltage, stator flux, rotor current, and rotor speed.

33. The device according to claim 23, wherein rotor voltage of the induction machine is determined as the manipulated variables from the first and second regulator output variables added to the feedback variables and stator flux, without further regulation.

34. The device according to claim 23, wherein the device comprises means for measuring stator voltage and rotor current of the induction machine.

35. The device according to claim 23, wherein the device comprises means for measuring stator current.

36. The device according to claim 1, wherein the device comprises means for measuring rotor speed of the induction machine or for determining it from stator voltage, stator current, and rotor current of the induction machine.

37. The device according to claim 23, wherein the device comprises means for measuring rotor position angle of the induction machine or for determining it from stator voltage, stator current, and rotor current of the induction machine.

38. The device according to claim 34, wherein the device comprises means for measuring voltages and currents of the induction machine and for transforming them in a two-phase coordinate system, and the device comprises means for transforming the manipulated variable determined in a two-phase coordinate system in a three-phase coordinate system.

39. The device according to claim 23, wherein the induction machine is a double-fed asynchronous machine, whose stator is connected directly to mains, and whose rotor is connected to an inverter.

40. An induction machine having a device for regulating the active power and reactive power of the induction machine in a coordinate system fixed on the winding according to claim 23.

* * * * *